3,471,253
PROCESS FOR PRODUCING SODIUM
METASILICATE PENTAHYDRATE
Richard C. Shaver, Auburn, N.Y., assignor to Cowles
Chemical Company, Cleveland, Ohio, a corporation of
Ohio
No Drawing. Filed May 24, 1966, Ser. No. 552,424
Int. Cl. C01b *33/32, 33/00*
U.S. Cl. 23—110                                        5 Claims

ABSTRACT OF THE DISCLOSURE

A process for producing a solution of sodium metasilicate which consists of mixing together an aqueous sodium silicate solution containing between about 50 to about 65 weight percent dissolved solids. The sodium oxide silica dioxide molecular ratio is adjusted to be about 1:2 to about 1:1.5. Thereafter, an aqueous solution containing 50 to about 73% sodium hydroxide is added to the sodium silicate solution to provide a resultant sodium metasilicate solution containing about 50 to 60 weight percent dissolved solids with a molecular ratio of sodium oxide to silica dioxide of 1:1. Sodium metasilicate pentahydrate is readily crystallized from the solution when the weight percent of dissolved solids is between about 57 and 58.

---

My invention relates to a process for producing sodium metasilicate pentahydrate ($Na_2O \cdot SiO_2 \cdot 5H_2O$ or $Na_2SiO_3 \cdot 5H_2O$) from silica and aqueous sodium hydroxide solutions.

In order to make clear the objects of my invention, a brief description of sodium silicate behavior, particularly sodium metasilicate, in aqueous solution is appropriate. At 57.5 percent sodium metasilicate and at 72.2° C. the solution is saturated in respect to the sodium metasilicate and the total composition of the liquid phase corresponds to sodium metasilicate pentahydrate. In effect, this is a melt of sodium metasilicate in its own water of crystallization. In the presence of a solid phase, the solubility of sodium metasilicate decreases above 72.2° C., the melting point of sodium metasilicate pentahydrate, the solubility being only 47.5% by weight at 90° C. However, sodium silicate solutions can become supersaturated quite readily in the absence of any solid phase and liquors of sodium metasilicate up to 75% anhydrous sodium metasilicate can be attained by evaporation of sodium metasilicate solutions. Crystalline anhydrous sodium metasilicate cannot be dissolved in water to much over 35% to 40% dissolved solids, a phenomenon that is not clearly understood, and it thus is necessary to evaporate the solution in the absence of undissolved crystalline sodium metasilicate in order to attain a 57.5% sodium metasilicate concentration—that is, a sodium metasilicate pentahydrate liquor. The sodium metasilicate pentahydrate melt (or liquor) is converted to the crystalline solid product by cooling the sodium metasilicate pentahydrate liquor to about 60° C. and then adding seeds with good agitation and cooling to about 48 to 52° C. Agitation is continued until a temperature rise starts, which indicates the start of the crystallization process and ultimately the whole mass of sodium metasilicate pentahydrate liquor crystallizes to a hard mass or granules, depending on whether or not agitation is stopped at the point when a temperature rise occurs or agitation is continued to the end of the crystallization process.

Sodium metasilicate pentahydrate is made commercially by reacting silica with a concentrated sodium hydroxide solution, which yields a sodium silicate solution having about 40 weight percent dissolved solids and an $Na_2O:SiO_2$ molar ratio of about 1:1, concentrating the sodium silicate solution by evaporation to about 57.5 weight percent dissolved solids, and crystallizing the sodium metasilicate pentahydrate. By dissolved solids is meant the total $Na_2O \cdot SiO_2$ or sodium silicate in solution. This commercial method utilizes a high $Na_2O:SiO_2$ molar ratio of about 1:1 which limits the dissolved solids content of the sodium silicate solution to about 40 or less weight percent. At about 40 weight percent solids content the reaction slows because the saturation point of metasilicate in water is approached. Such sodium metasilicate solutions, having about 1:1 molar ratio, have a limiting concentration of about 40 to 42 weight percent dissolved solids above which anhydrous metasilicate will precipitate out. This precipitation is objectionable since the metasilicate cannot be separated from the unreacted sand. On the other hand, in order to crystallize sodium metasilicate pentahydrate, it is necessary to have a solution of sodium metasilicate containing about 57.5 weight percent dissolved solids and having about a 1:1 molar ratio. Therefore, it can be seen that this commercial method requires a large amount of water to be evaporated from the 40 weight percent solution to yield a 57.5 weight percent solution from which sodium metasilicate pentahydrate can be crystallized.

I have now devised a method of producing a sodium metasilicate solution, from which the pentahydrate can be readily crystallized, which eliminates or substantially reduces the above-described expensive evaporation operation. I have found that such a sodium metasilicate solution can be formed by admixing an unsaturated sodium silicate solution and an unsaturated caustic solution.

According to my invention, this solution is produced by admixing (a) a concentrated aqueous sodium silicate solution containing between about 50 to about 65 weight percent dissolved solids having an $Na_2O:SiO_2$ molar ratio of between about 1:2 to about 1:1.5, and (b) a concentrated aqueous sodium hydroxide solution containing between about 50 to about 73 weight percent sodium hydroxide, the sodium hydroxide solution being used in such proportion to the sodium silicate solution that a sodium metasilicate solution is formed containing between about 50 to about 60 weight percent dissolved solids and with an $Na_2O:SiO_2$ molar ratio of about 1:1. When the amount of dissolved solids in the sodium metasilicate solution is between 57 to 58 weight percent, as can readily be obtained by the use of 70 to 73 percent sodium hydroxide solution, no evaporation is required. When the amount of dissolved solids in the sodium metasilicate solution is between about 50 to below about 57 weight percent, as will be obtained when a solution (b) of less than about 70 percent sodium hydroxide is used, water is evaporated from the solution to provide a 57 to 58 weight percent concentration providing a great reduction in the amount of evaporation needed as compared with that required by the prior 40 weight percent solutions. When the amount of dissolved solids in the sodium metasilicate solution exceeds about 57 to 58 percent, it may be diluted with water to obtain the desired 57 to 58 percent concentration.

The concentrated sodium silicate solution (a) that is used to make the sodium metasilicate solution can be made in a reactor from sodium hydroxide and sand, as will be described in more detail below, by dissolving the silica with about one-half of the stoichiometric amount of sodium hydroxide required to form sodium metasilicate to give a concentrated sodium silicate solution of about 1:2 to about 1:1.5 molar ratio and containing between about 50 to about 65 weight percent dissolved solids. This silicate solution is then treated with sufficient amounts of about 50 to about 73 weight percent sodium hydroxide solution (b) to yield a solution of sodium metasilicate containing between about 50 to about 60 weight percent dissolved solids and having a molar ratio of about 1:1.

In the modification where no evaporating step is required a silicate solution (a) is prepared of about 1:2 to about 1:1.5 molar ratio and containing between about 56 to about 60 weight percent dissolved solids. This silicate solution is then treated with sufficient amounts of about 70 to about 73 weight percent sodium hydroxide solution (b) to yield a solution of sodium metasilicate containing between about 57 to about 58 weight percent dissolved solids and having a molar ratio of about 1:1.

By adjusting the $Na_2O:SiO_2$ molar ratio of the silicate solution (a) to about 1:1 with a very concentrated sodium hydroxide solution (b), i.e. of about 70 to about 73 weight percent sodium hydroxide, with the dissolved solids content being near 57.5 weight percent sodium metasilicate pentahydrate can subsequently be crystallized. This is made possible by reduction of the $Na_2O:SiO_2$ molar ratio of the initial reaction ingredients, whereby the desired dissolved solids level is achieved, and then increasing the molar ratio to about 1:1 by addition of concentrated sodium hydroxide.

The admixing of silicate solution (a) and caustic solution (b) is preferably carried out in a zone separate from the reactor used to prepare the silicate solution as this permits the more ready separation of sand and other impurities from the silicate solution before the addition of the caustic solution. The caustic solution can, however, be added to the silicate solution in the reactor, if desired, and the unreacted sand filtered out of the final solution. The solutions are preferably admixed at a temperature of about 80 to about 90° C. although temperatures of about 50 to about 120° C. can be used. At temperatures below about 50° C. viscous solutions are encountered and the upper limit of is the boiling point of the solution, in this exothermic reaction. Preferably, the caustic solution is added to the silicate solution with stirring until the reaction is completed. A solution of sodium metasilicate, as described above, is formed and recovered. The pentahydrate solution is readily crystallized by conventional seeding and cooling tcehniques.

The sodium silicate solution (a) is preferably prepared in a reactor from sand and caustic as follows. The silica should be sand which is low in impurities such as, for example, iron which causes undesirable sodium metasilicate coloration. Also, since the amount of impurity in the sand controls the amount of insoluble product in the silicate, care should be taken to control the purity of the sand. The sodium hydroxide solution used is a concentrated solution and a 50 weight percent solution, for example, has been found to produce satisfactory handling and reaction results. A 50 weight percent caustic solution is particularly preferred because lower concentrations decrease the reaction rate and require some evaporation to arrive at the desired concentration of dissolved solids in silicate solution (a).

The reactor is preferably operated at a temperature of about 210° C., although temperatures between about 190° to about 220° C. can be used. I have found that above about 220° C. there is a tendency for certain silicates to precipitate. The operating temperature has a definite effect on the rate of reaction and an operating temperature of about 210° C. produces optimum rate of reaction and provides desirable equipment design. The reactor is preferably operated at a pressure of about 225 p.s.i.g. although pressures between about 215 to about 225 p.s.i.g. can be used.

At the lower molar ratios of $Na_2O \cdot SiO_2$, the reaction rate is slow and a finely divided silica is required. At the higher molar ratios, the solids concentration of the sodium silicate solution is limited by the precipitation of insoluble anhydrous sodium metasilicate. As the unreacted sand is subsequently removed from the silicate solution, the precipitated, insoluble, anhydrous sodium metasilicate represents a product loss. As already stated, I have found that reaction of silica and a 50 weight percent sodium hydroxide solution, in the amounts that give a silicate solution having an $Na_2O:SiO_2$ molar ratio between about 1:2.0 to about 1:1.50, yields a silicate solution which contains between about 56 to about 60 weight percent dissolved solids. This eliminates the need of evaporation in the subsequent processing to yield a 57.5% solids sodium metasilicate solution.

By using a quantity of sand that is at least about 30 weight percent in excess of that stoichiometrically required in the reactor, optimum reaction rates can be attained. The use of larger amounts of excess sand does not greatly increase the reaction rate. When excess sand is used, the reaction may go too far and the resultant near gel is difficult to remove from the system. The presence of small amounts of unreacted sand in the sodium silicate solution (a) does not appear to cause the precipitation of any meaningful amount of anhydrous sodium metasilicate before completion of the reaction between the silicate solution (a) and the added 70 weight percent sodium hydroxide solution (b). The unreacted sand can be readily filtered out of the sodium metasilicate solution (about 1:1 molar ratio).

When the reaction conditions are 210° C. and 225 p.s.i.g., the holding time at these conditions for nearly complete conversion is about 3 hours. When an excess of 15 weight percent of sand is added, the holding time at these conditions is reduced to about 1.5 hours. Thus, the holding times can be readily determined.

The reactor should be fabricated from a non-ferrous metal, such as nickel, which has a high corrosion resistance to concentrated alkali solutions. It is desirable to keep the iron content of the silicate solution (a) as low as possible, such as, less than 30 p.p.m., to avoid development of yellow colors in the finished product. Nickel itself may be undesirable as a reactor fabrication material, as it is a member of the iron-nickel-cobalt family which often forms highly colored complexes. A material such as 316 stainless steel is a satisfactory fabrication material.

My invention will be further illustrated by the following examples.

Example 1

The sodium silicate solution (a) was prepared as follows. A charge was placed into a reactor by first introducing a 50 weight percent sodium hydroxide solution in the amount of 1215 grams (55.2% of the total charge weight) plus water in the amount of 219 grams and then adding sand (silica) in the amount of 766 grams (34.8% of the total charge weight). The total charge weight was 2200 grams (about 1500 ml.).

The reactor was a paddle stirred (175 r.p.m.), baffled autoclave which was completely submerged in a controlled temperature oil bath. After introduction of the silica and caustic, the charging port of the reactor was closed and heating was commenced. It took 95 minutes for the internal reactor temperature to build up to 210° C. The internal reactor temperature was held at 210° C. for 180 minutes. The internal reactor pressure during the temperature holding period was 225 p.s.i.g.

At the end of the temperature holding period, the reactor was allowed to cool in air to about zero gage pressure before being opened to the atmosphere. The internal reactor temperature was allowed to drop to about 85° C. before the reactor contents were discharged through a bottom port and excess sand and other impurities filtered out. The hot sodium silicate solution was analyzed and found to contain 57.53% dissolved solids and to have a $Na_2O:SiO_2$ molar ratio of 1:1.64.

Then, 583 grams of 70 weight percent sodium hydroxide solution (b) were added with stirring to the hot sodium silicate solution at a temperature of 80° C. to obtain a sodium metasilicate solution that contained 57.5 weight percent solids and had a $Na_2O:SiO_2$ molar ratio of 1:1. The admixing was done in a vessel equipped with stirring means. This sodium metasilicate solution is obtained without having to resort to expensive evaporation of the reactor products solution.

Sodium metasilicate pentahydrate was crystallized by seeding the solution with metasilicate crystals at about 60 to 65° C., cooling the solution to about 48 to 52° C. and continuing agitation until the temperature started to rise, when the pentahydrate crystallized to a hard mass.

Example 2

A sodium silicate solution (a) was prepared as in Example 1 as follows. A charge was placed into the reactor by first introducing a 50 weight percent sodium hydroxide solution in the amount of 1104 grams (49.98% of the total charge weight) plus water in the amount of 200 grams (40.97% of the total charge weight) and then adding sand (silica) in the amount of 905 grams (40.97% of the total charge weight). The total charge weight was 2200 grams (about 1500 ml.). The reaction was carried out as in Example 1 to obtain a sodium silicate solution containing 58.6% dissolved solids and having a $Na_2O:SiO_2$ molar ratio of 1:1.69.

Then, 1066 grams of 50 weight percent sodium hydroxide solution were added with stirring to the hot sodium silicate solution at a temperature of 80° C. to obtain a sodium metasilicate solution that contained 53.2 weight percent solids and had a $Na_2O:SiO_2$ molar ratio of 1:1. The admixing was done in a vessel equipped with stirring means. This sodium silicate solution contained 53.2 weight percent solids. The solution was evaporated to attain a 57.5 weight percent solids solution and the sodium metasilicate pentahydrate was crystallized as in Example 1.

I claim:
1. The process of producing sodium metasilicate pentahydrate which comprises admixing at a combined solution temperature of about 50° C. to about 120° C. (a) an aqueous sodium silicate solution containing between 56 to about 60 weight percent dissolved solids and having a $Na_2O:SiO_2$ molar ratio of between about 1:2 to about 1:1.5 and (b) an aqueous solution containing between about 70 to about 73 weight percent sodium hydroxide, the sodium hydroxide solution being in such proportion to the sodium silicate solution to provide a resultant sodium metasilicate solution containing between about 57 to about 58 weight percent dissolved solids and having a $Na_2O:SiO_2$ molar ratio of about 1:1; and crystallizing sodium metasilicate pentahydrate from the sodium metasilicate solution.

2. The process of claim 1 wherein the sodium silicate solution (a) is prepared by reacting silica and aqueous sodium hydroxide solution.

3. The process of claim 2 wherein the sodium hydroxide solution and the silica are reacted at a temperature between about 190° to about 220° C.

4. The process of claim 2 wherein the sodium hydroxide solution reacted with the silica contains about 50 weight percent sodium hydroxide.

5. The process of claim 2 wherein the silica is used in an amount up to about 30 weight percent in excess of that stoichiometrically required for the reaction.

References Cited

UNITED STATES PATENTS

| | | | |
|---|---|---|---|
| 1,898,707 | 2/1933 | Baker | 23—110 |
| 2,153,872 | 4/1939 | McDaniel | 23—110 |
| 2,230,909 | 2/1941 | Riggs et al. | 23—110 |
| 3,208,229 | 9/1965 | Baker et al. | 23—110 |
| 3,257,325 | 6/1966 | Koster et al. | 23—110 X |

FOREIGN PATENTS 827,383  2/1960  Great Britain.

EDWARD J. MEROS, Primary Examiner